United States Patent [19]

Uttermark

[11] Patent Number: 4,675,861
[45] Date of Patent: Jun. 23, 1987

[54] FIBER OPTIC MULTIPLEXER

[75] Inventor: John A. Uttermark, White Bear Lake, Minn.

[73] Assignee: ADC Telecommunications, Inc., Bloomington, Minn.

[21] Appl. No.: 675,724

[22] Filed: Nov. 28, 1984

[51] Int. Cl.[4] .............................................. H04B 9/00
[52] U.S. Cl. ....................................... 370/4; 328/104; 328/154; 370/112
[58] Field of Search ..................... 370/4, 112; 307/243; 328/104, 154

[56] References Cited

U.S. PATENT DOCUMENTS

| | | | |
|---|---|---|---|
| 3,912,872 | 10/1975 | Callens | 370/112 |
| 4,161,650 | 7/1979 | Caouette et al. | 455/612 |
| 4,276,656 | 6/1981 | Petryk, Jr. | 455/608 |
| 4,356,485 | 10/1982 | Boschulte et al. | 455/608 |
| 4,393,516 | 7/1983 | Itani | 455/608 |
| 4,450,554 | 5/1984 | Steensma et al. | 370/4 |
| 4,466,097 | 8/1984 | Nose | 370/112 |
| 4,473,901 | 9/1984 | Jensen | 370/100 |

FOREIGN PATENT DOCUMENTS

| | | |
|---|---|---|
| EP53239 | 6/1982 | European Pat. Off. |
| EP94096 | 11/1983 | European Pat. Off. |
| 2110034A | 9/1982 | United Kingdom |
| 2131246A | 10/1983 | United Kingdom |

OTHER PUBLICATIONS

"DP8342 High-Speed Serial Transmitter/Encoder", product description, National Semiconductor Corp., Apr. 1983.
"DP8343 High-Speed Serial Receiver/Decoder", product description, National Semiconductor Corp., Apr. 1983.
"ODS 101, RS 232 Synchronous Fiber Optic Modem with Control Lines", Optical Data Systems, date unknown, sales brochure.
UK Examiner's Search Report, 12/24/85.
"Digital Transmission of Video and Audio Signals Over an Optical-Fibre System", N. H. C. Gilchrist, *The Radio and Electronic Engineer*, vol. 49, No. 12.

*Primary Examiner*—Joseph A. Orsino, Jr.
*Attorney, Agent, or Firm*—Merchant, Gould, Smith, Edell, Welter & Schmidt

[57] ABSTRACT

A fiber optic multiplexer/demultiplexer includes a serial transmitter encoder for encoding an 8-bit parallel byte into a serial data stream applied to a fiber optic coupler. A pair of 4-bit latches are alternately clocked to sample four parallel format digital signals to form a byte for loading into the encoder. The serial receiver decoder receives a serial data stream from another fiber optic coupler and converts the data stream to a parallel 8-bit byte. A 4-bit multiplexer is provided for demultiplexing the byte one nibble at a time down to form parallel format digital signals. An alternate embodiment calls for the omission of the 4-bit latches and multiplexer such that 8 signals may be multiplexed.

1 Claim, 5 Drawing Figures

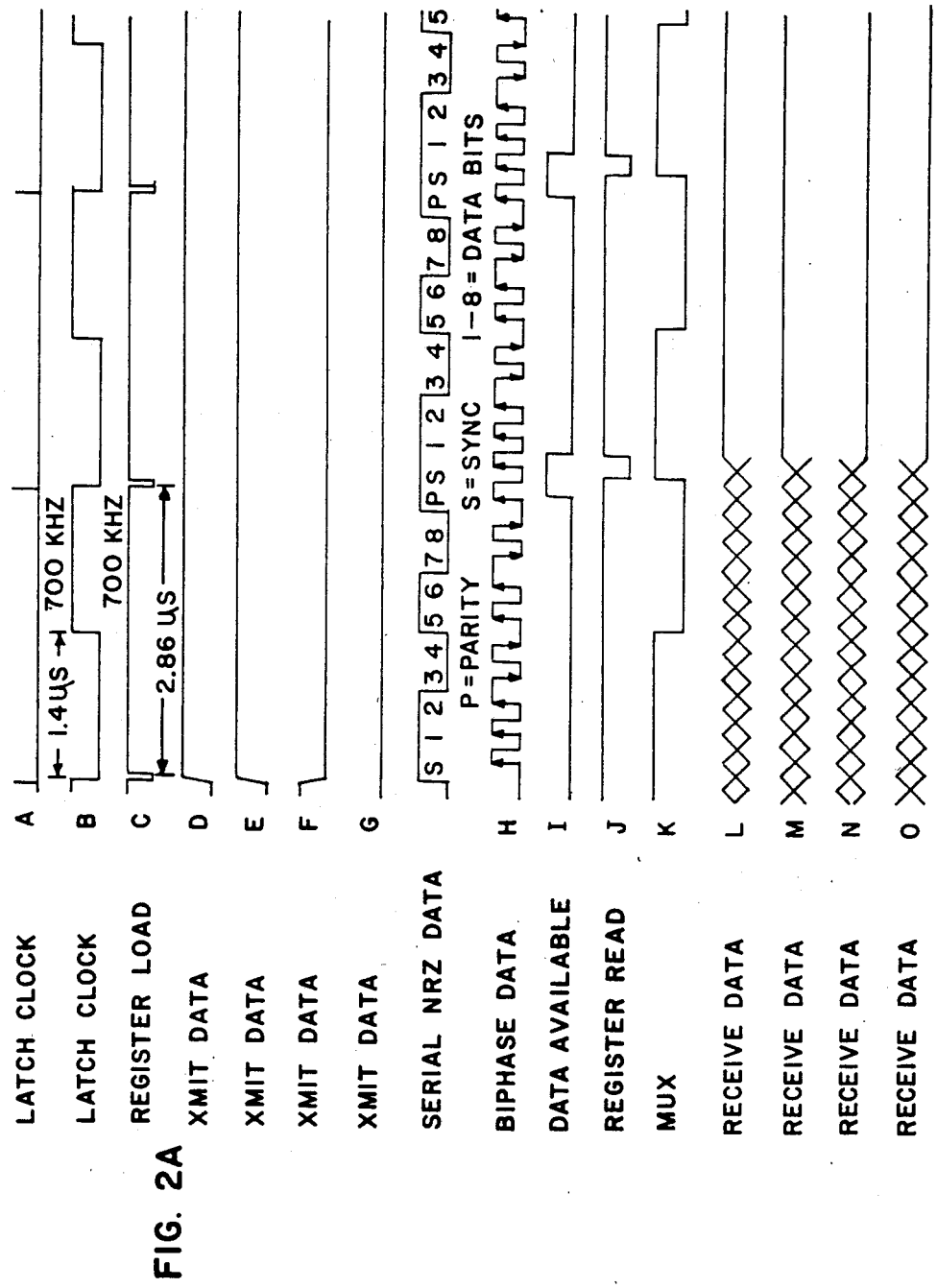

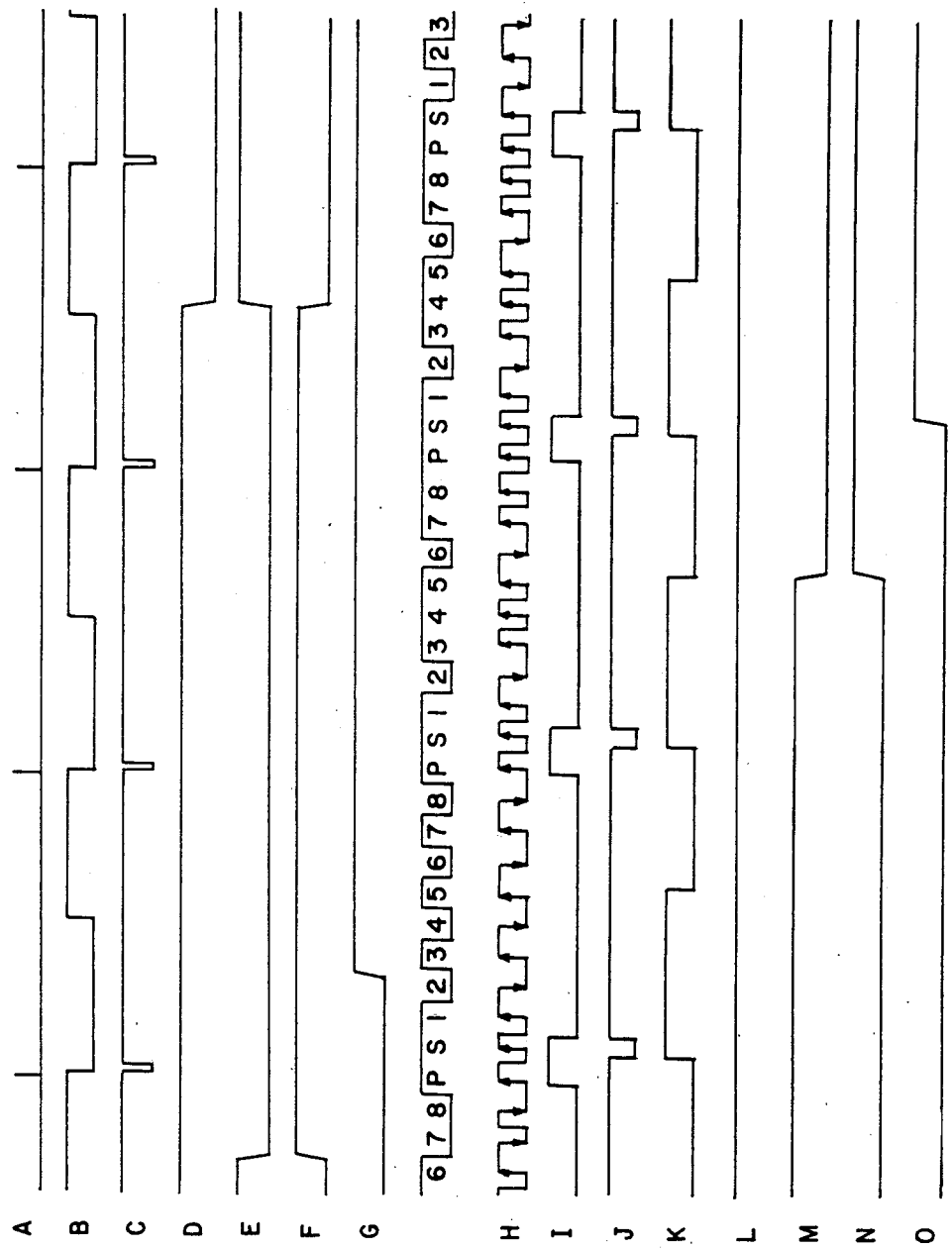

FIBER OPTIC MULTIPLEXER

TECHNICAL FIELD OF THE INVENTION

The present invention pertains generally to the field of serial information transfer and more particularly to a circuit for multiplexing a plurality of signals over an optical fiber.

BACKGROUND OF THE INVENTION

The use of optical fibers for the transmission of information via impulses of light has grown steadily in recent years as an alternative to conventional wire links, i.e. metal conductors. Because optical fibers have a greater bandwidth and lower impedance than metal conductors, the fibers can carry comparatively more information per unit time over comparatively greater distances. In addition, optical fibers are considerably less susceptible than metal conductors to unauthorized "taps", and eliminate R.F. problems and the need for electrical isolation interfaces such as opto-isolators While optical fibers are superior in many respects to wire links for information transfer, it is not economical to use the fibers as a direct replacement for individual metal conductors. Optical fibers can be, however, an economical alternative to wire links where their superior bandwidth may be taken advantage of via multiplexing such that numerous conventional wire links may be replaced with a single fiber. Or, where optical fibers are desired for transmission security reasons alone regardless of cost, they can at least be made more economical if they can be used to replace several wire links. For example, computer equipment is commonly connected via RS232 or RS422 interfaces, with the interface cables running between equipment in different locations in a building or between equipment in different buildings. Such cables are susceptible to unauthorized taps via which proprietary data may be misappropriated, or via which unauthorized and potentially disastrous entry to a computer system may be obtained. Accordingly, where security is a concern it is highly desirable to substitute more secure optical fibers for the various lines of the cables. At the same time, however, it is desirable to maintain the architecture and protocol of the interface or, in other words, provide that the optical fiber link be function-wise "transparent", such that modifications to equipment may be avoided. While this may be accomplished by merely substituting each conductor of a cable with an optical fiber, and providing fiber optic couplers on either end of each fiber to translate back and forth between electrical and light signal transmissions, it is a waste of the superior bandwidth of the fibers, which have the capacity to carry (at the typical communications frequencies of MIL 188C, RS232 or RS422 interfaces) several lines worth of information. The more economical alternative is of course to multiplex several lines over a single fiber.

In most typical data communication multiplexers, each synchronous/asynchronous serial channel is interfaced via a USART (Universal Synchronous/Asynchronous Receiver-Transmitter). In the case of asynchronous mode, each USART must be "programmed" for baud rate, number of bits per byte, number of stop bits, etc. These multiplexers are not transparent in that channel interfaces cannot be mixed without reprogramming. In addition, they do not encode any control signals, i.e. Request-to-send, Clear-to Send, Carrier Detect, Data Terminal Ready, Data Set Ready, etc . . . This can be a major drawback in some systems such as IBM ® Bi-Synch where the system software relies on the carrier detect signal to determine when to transmit (half-duplex system). Also, typical multiplexers are designed in respect of a known predetermined timing relationship between the signal to be multiplexed, keying on one or more control signals which are indicative of the timing of the data signals. However, where it is not known for the purposes of design what the timing relationship between signals is to be, as for example may be the case for security reasons, typical multiplexing circuits are of no use.

Accordingly, the present invention provides a fiber optic multiplexing circuit in which signals are multiplexed over an optical fiber without regard to timing relationships or signal functions (i.e. control vs. data). The multiplexing circuit of the present invention is also transparent in that it requires no programming, such that it may be introduced as a substitute for several existing interface lines without affecting signal timing on either end of the interface.

SUMMARY OF THE INVENTION

The present invention provides a transparent fiber optic multiplexer/demultiplexer via which a plurality of data signals carried on individual lines may be encoded and multiplexed to an optical fiber in serial format and via which serial format data received from an optical fiber may be decoded and demultiplexed to a plurality of individual signals and lines. According to a first embodiment of the invention first and second n-bit latches are provided with each connected to a n-bit bus carrying n digital signals. Each of the latches are independently clocked on an alternating basis such that successive samples of the digital signals are acquired, and such that the samples form a 2n-bit byte. A serial transmitter/encoder is provided and includes a 2n-bit holding register connected to the latches. The encoder is responsive to a register load signal generated by a data load control circuit in order to load the 2n-bit byte held in the latches into the holding register, from where it is encoded as serial biphase data (self-clocked) and shifted out in serial format. A fiber optic coupler is provided to receive the serial biphase data, convert it to corresponding impulses of light, and couple the impulses to an optical fiber.

According to another aspect of the first embodiment of the invention a second fiber optic coupler is provided to couple to an optical fiber and to convert a 2n-bit serial biphase stream of light impulses transmitted on the fiber to a corresponding electrical serial stream. A serial receiver/decoder is provided and receives the converted biphase stream, decodes it into a parallel format 2n-bit byte, and sets a data available signal. A data unload control circuit monitors the data available signal to generate a read register signal to the decoder in response to which the decoder loads the byte into a 2n-bit holding register. A multiplexer is provided and is connected to the decoder holding register for sequentially demultiplexing the contents of the register n-bits at a time to a n-bit parallel bus.

According to another embodiment of the invention there is omitted the first and second latches and multiplexer of the first embodiment, such that 2n parallel signals may be multiplexed and demultiplexed from and to 2n-bit parallel buses. The above-summarized aspects, together with more detailed aspects of the invention are described in more detail below in the ensuing specification and drawing.

BRIEF DESCRIPTION OF THE DRAWING

FIGS. 2A, 2B and 2C comprise a timing diagram illustrative of the operation of the multiplexer/demultiplexer of FIG. 1.

DETAILED DESCRIPTION OF THE INVENTION

Figure 1:
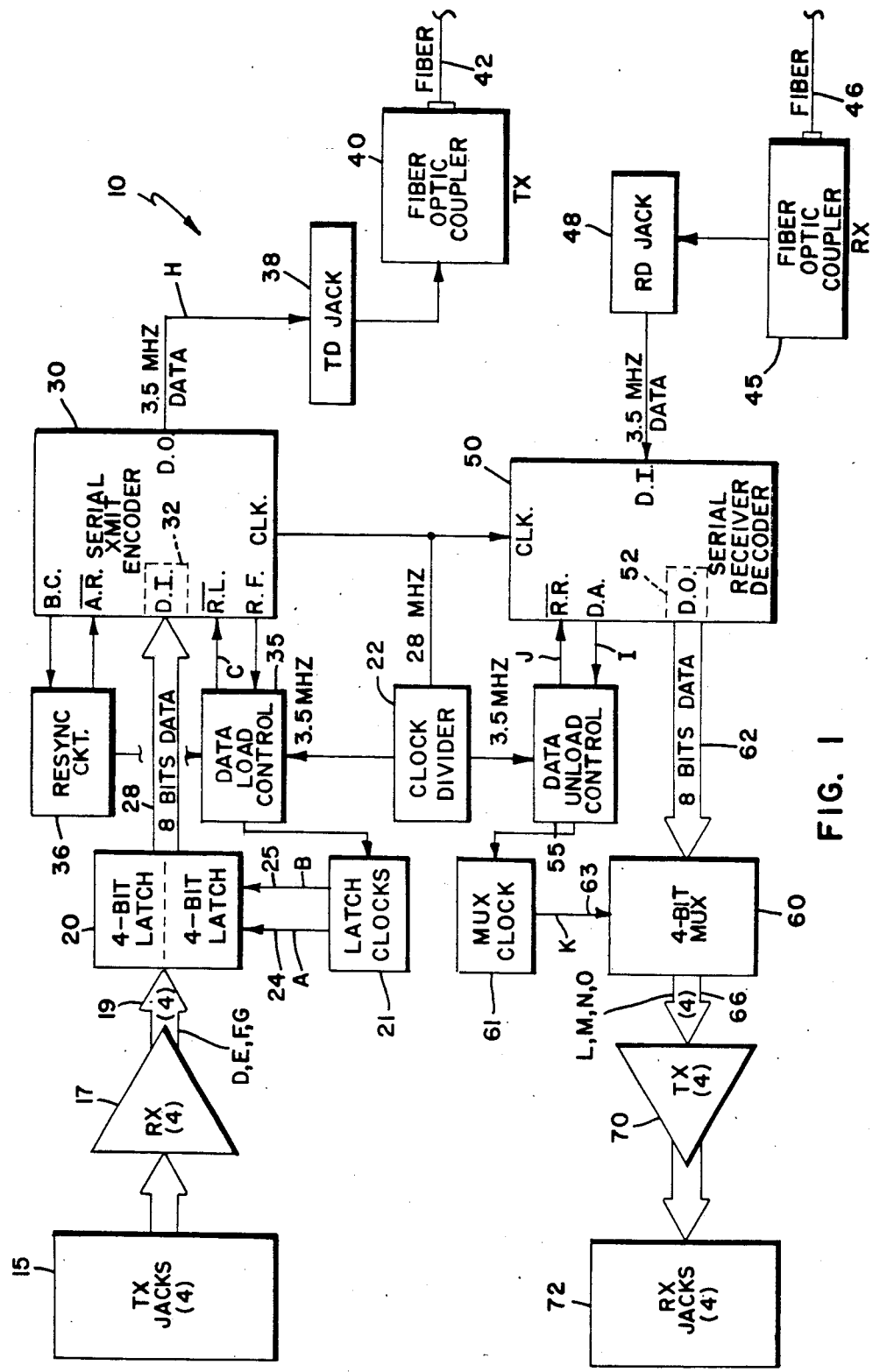
FIG. 1 is a simplified block diagram of the fiber optic multiplexer/demultiplexer according to the present invention.

The present invention provides a multiplexer/demultiplexer capable of multiplexing a plurality of parallel format digital signals over an optical fiber in serial format and of demultiplexing data received in serial form over an optical fiber into parallel format digital signals. As illustrated in FIG. 1, the present invention is adapted for implementation in a jackfield, via which the signals to be multiplexed may be patched or monitored. The invention is particularly suited for multiplexing signals carried on the lines of a MIL 188C, RS232C, or RS422 interface over optical fibers.

Referring to FIG. 1 there is shown a simplified block diagram of a first embodiment the fiber optic multiplexer/demultiplexer 10 according to the present invention. Four PC jacks 15 are provided via which four parallel format signals may be fed into the multiplexer-transmitter side of circuit 10. Four balanced receivers 17 are provided via which each of the signals patched into jacks 15 may be converted from MIL 188C, RS232C or RS422 format to corresponding TTL levels. A bus 19 is provided to convey the TTL level signals from receiver 17 to each one of a pair of 4-bit latches 20. Each of latches 20 are independently operative in response to a pair of clocking signals (carried on lines 24 and 25) generated by a latch clock 21, which is operatively synchronized with a data load control circuit 35. In operation, latches 20 may acquire successive four-bit samples (each bit corresponding to the TTL level of a corresponding signal on bus 19) and convert those samples to a parallel format 8-bit byte, which is applied to a bus 28. The timing of latches 20 is controlled such that the lower four bits (bits 1–4) correspond to a sample preceding the sample represented by the upper four bits (bits 5–8). Bus 28 carries the 8-bit byte to the input of serial transmitter/encoder 30 which converts the parallel format 8-bits into a serial biphase data stream. Serial transmitter/encoder 30 consists of a DP8342 High-Speed Serial Transmitter/Encoder integrated circuit manufactured by National Semiconductor Corporation, 2900 Semiconductor Drive, Santa Clara, Calif. 95051. For the sake of brevity in the drawing, only the key input and output connections to the DP8342 encoder 30 are shown. (The DATA IN (D.I.) inputs of encoder 30 correspond to DP8342 pins 3–10, the REGISTER LOAD (not) ($\overline{\text{R.L.}}$) input corresponds to DP8342 pin 23, the REGISTER FULL(R.F.) output corresponds to DP8342 pin 22, the CLOCK OUT (CLK.) output corresponds to DP8342 pin 11, the DATA OUT(D.O.) output corresponds to DP8342 pin 16, the BYTE CLOCK(B.C.) corresponds to DP8342 pin 2, and the AUTOMATIC RESPONSE(not) ($\overline{\text{A.R.}}$) input corresponds to DP8342 pin 21.) Although not shown it shall be understood that encoder 30 includes a connection to an appropriate crystal and that other necessary connections to power, ground, etc. are provided for, as those skilled in the art could readily provide for.

Encoder 30 includes a holding register 32 via which data present on bus 28 may be captured and held for encoding into a serial data stream, which is shifted out of encoder 30 at its D.O. output. Holding register 32 captures and holds data in response to a REGISTER LOAD signal applied at its $\overline{\text{R.L.}}$ input, which signal is generated by data load control circuit 35. Once register 32 is loaded, encoder 30 automatically proceeds to encode the data in serial form and transmit to fiber optic coupler 40 through transmitted-data jack 38, via which the output data stream may be patched or monitored. Encoder 30 generates a REGISTER FULL signal (from the R.F. terminal) from the time that register 32 is loaded until substantially all the data in the register has been encoded and transmitted. The REGISTER FULL signal is applied to data load control 35, which further receives a 3.5 MHZ clocking signal from clock divider 22 and a resynch signal from resynch circuit 36. Clock divider 22 receives a 28 MHZ clocking signal from the CLK. output of encoder 30 via which it generates the 3.5 MHZ clocking signal to data load control 35.

Fiber optic coupler 40 is provided to receive the output serial data stream from encoder 30, convert the stream into corresponding light impulses and couple the impulses onto an optical fiber 42 which may carry the impulses to an optic coupler receiver in a further multiplexer/demultiplexer circuit of like design for demultiplexing back to parallel electrical signal format.

On the receiver-decoder side of circuit 10 a further fiber optic coupler 45 is provided to receive light impulses transmitted over an optical fiber 46 and to convert the impulses to a corresponding serial stream of electrical signals. The received data stream is coupled through a received-data jack 48, via which the stream may be monitored or patched, to a serial receiver/decoder circuit 50. Decoder circuit 50 consists of a DP8343 High-Speed Serial Receiver/Decoder integrated circuit manufactured by National SemiConductor, at the address noted above. As in the case of the serial transmitter/encoder 30, serial receiver/decoder 50 is shown in simplified form with only the key inputs and outputs illustrated. (The READ REGISTER(not)($\overline{\text{R.R.}}$) input corresponds to DP8343 pin 9, the CLOCK INPUT(CLK.) corresponds to DP8343 pin 23, the SERIAL DATA INPUT(D.I.) corresponds to DP8342 pin 22, the DATA OUTPUT(D.O.) corresponds to DP8343 pins 14–21, and the DATA AVAILABLE(D.A.) output corresponds to DP8343 pin 10.)

In operation, receiver/decoder 50 receives a 3.5 MHZ serial biphase data stream at its D.I. terminal and converts the stream into a parallel format 8-bit byte. When a byte has been assembled, a DATA AVAILABLE signal is generated at the D.A. output, which signal is monitored by the data unload control circuit 55, which further receives a 3.5 MHZ clocking signal from clock divider 22. When the DATA AVAILABLE signal is activated data unload control circuit 55 generates a REGISTER READ signal in response to the clock signal from clock divider 22. The REGISTER READ signal is applied to the R.R. input of decoder 50, which causes the assembled eight bits to be loaded into holding register 52.

A four-bit multiplexer 60 is provided and receives the eight bits in holding register 52 via a bus 62. Multiplexer 60 operates in response to a multiplexing signal generated by a multiplexer clock 61 and carried on a conductor 63 in order to multiplex the contents of holding register 52 onto a four-bit bus 66. Multiplexer 60 demultiplexes the eight bits held in holding register 52 one nibble at a time, such that the lower four bits (i.e. bits 1–4) are multiplexed out first, with the upper four bits (i.e. bits 5–8) following thereafter.

A converter circuit 70 is provided, and receives TTL level signals from multiplexer 60 and bus 66 and converts them to MIL 188C, RS232 or RS422 levels, which signals are coupled to four receiver jacks 72, via which they may be patched or monitored.

Also provided in the multiplexer-transmitter circuit is a resynchronization circuit 36 which is provided for the purpose of periodically resynching the biphase data stream. By interrupting the loading of new data into holding register 32 for two encoding cycles encoder 30 automatically generates a non-conforming bit output, which is detectable by a receiver/decoder 50 for the purpose of resynchronizing the decoding of the data stream. Alternatively, it is contemplated that resynchronization may be accomplished by forcing the $\overline{A.R.}$ (automatic response) input of encoder 30 to the logic "0" state, causing encoder 30 to generate clean status (all zeros on data bits), which is also detectable by decoder 50 for the purpose of resynchronization. Resynchronization circuit 36 provides for the periodic resynchronization of encoder 30 in either of the above manners by counting the number of bytes transmitted by encoder 30 via the BYTE COUNT signal (output from terminal B.C.) and either inhibiting data load control circuit 35 for two encoding cycles or forcing the $\overline{A.R.}$ input low for one clock cycle each time a predetermined number of bytes (transmitted) have been counted. In the preferred embodiment resynchronization occurs every 5.8 ms. However, this cycle time is arbitrary, and can be made longer or shorter without respect to the other timing of the multiplexer-transmitter.

Figure 2C:
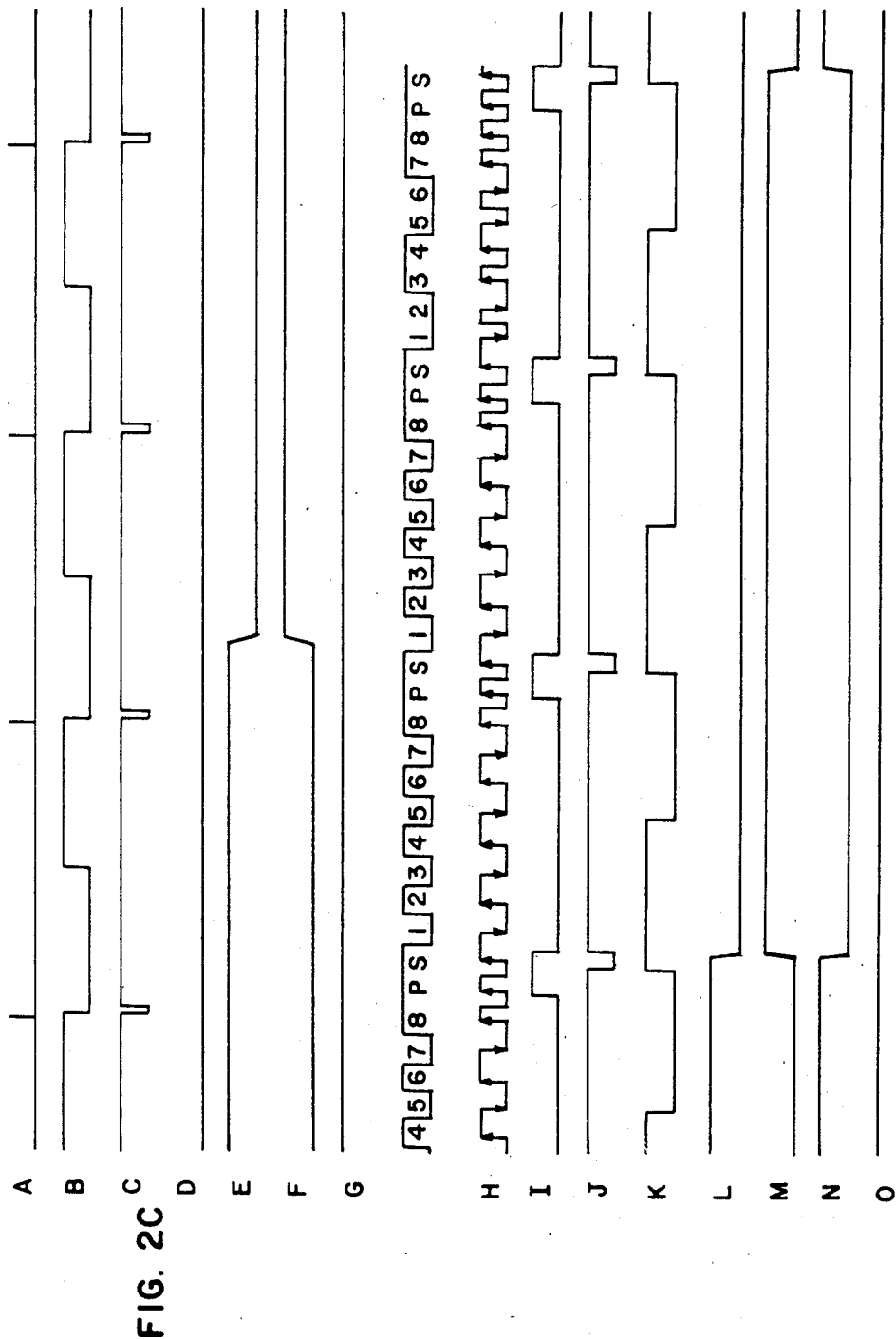

FIGS. 2A, 2B and 2C may be laid end to end to form a timing diagram illustrative of the operation of the multiplexer/demultiplexer of FIG. 1. It shall be noted that for the sake of brevity in the drawing only key signals are illustrated. Each of the signals shown in FIGS. 2A, 2B and 2C is designated with an upper case letter by which they may be related to the various nodes of the circuit of FIG. 1, which includes corresponding upper case designations.

To make the diagram of FIG. 2A, 2B and 2C meaningful, the timing is shown in respect of four arbitrarily defined transmit data signals D-G, which would be introduced via bus 19 to the multiplexer-transmitter side of the circuit of FIG. 1. Generally, the top half of the timing diagram illustrates the encoding of the data signals into a serial biphase data stream H, while the bottom half illustrates the decoding of the serial biphase data stream H into the parallel format received data signals L-O. To facilitate the understanding of the timing diagram, serial biphase data stream H, is illustrated in its corresponding serial NRZ data stream format, which appears above stream H in the diagram. It shall be understood, however, that the NRZ stream is provided only for reference in understanding the timing diagram, and does not correspond to any signal generated by multiplexer/demultiplexer 10.

The operation of the multiplexer-transmitter of the multiplexer/demultiplexer of FIG. 1 will now be described. Preferably, encoder 30 has an encoding cycle of 2.86 micoseconds, during which the 8 parallel bits held in its holding register 32 are converted to serial biphase form and shifted out its D.O. output. Encoder 30 additionally provides during each cycle a synch-bit (S) preceeding the data bits, and a parity-bit (P) following the data bits. Accordingly, encoder 30 produces a 3.5 MBS (megabits per second) serial data stream, and provides for a maximum parallel loading rate of 350K bytes/sec (for 8-bit bytes). As illustrated, a REGISTER LOAD signal is applied to the $\overline{R.L.}$ input of encoder 30 approximately every 2.86 microseconds. As described above, the register load signal is generated by data load control 35 in response to the REGISTER FULL signal generated at the R.F. output of encoder 30, and a 3.5 MHZ timing signal from clock divider 22. In operation the REGISTER FULL signal is raised high immediately after holding register 32 is loaded, dropping when the encoding cycle is substantially complete, i.e. contemporaneously with the encoding of the parity-bit.

Preferably, each of 4-bit latches 20 are clocked at 700 KHZ (signals A and B), with the clocking 180 degrees out of phase. Accordingly, each latch acquires one sample (4-bits or one nibble) of the transmit-data signals between each register load operation. The samples taken together form the 8 bits of data loaded into the transmitter encoding register 32, as initiated by the REGISTER LOAD signal. Accordingly, it will be seen that just prior to a register load operation latches 20 hold two samples of transmit-data signals D-G, with each sample indicative of the status of the data signals at different sequential times, one sample (bits 5–8) just prior to a register load operation, and one sample (bits 1–4) approximately half-way between register load operations. Thus, the lower four bits correspond to a sample taken prior to the sample represented by the upper four bits. This sampling technique provides that transmit data signal transitions occuring between the samples may be detected and encoded and that an effective sampling rate of 700 KHZ is obtained. As will be explained further below, the receiver-demultiplexer of multiplexer/demultiplexer 10 of FIG. 1 demultiplexes 8-bit parallel bytes one nibble or four bits at a time, with the lower four bits (bits 1–4) demultiplexed first, and the upper four bits (bits 5–8) second. Thus, the upper and lower nibbles are demultiplexed in the same sequence as they are acquired.

The operation of the receiver-decoder of the multiplexer/demultiplexer 10 in FIG. 1 will now be explained. As mentioned above, the operation of the receiver-demultiplexer is illustrated in respect of the reception of the serial biphase data stream H, which would be introduced via fiber optic coupler 45 and jack 48 to the D.I. input of serial receiver/decoder 50. As described above, decoder 50 receives a biphase data stream and decodes the stream into a 8-bit byte (the parity and synch bits are stripped off). Once a byte has been decoded, decoder 50 generates a DATA AVAILABLE signal at its D.A. output. Unload control 55 responds to the DATA AVAILABLE signal by producing a REGISTER READ signal for application to the $\overline{R.R.}$ input of decoder 50 in response to a clocking signal from clock divider 22. The byte is thus loaded into receiver holding register 52, and presented to bus 62, which is applied to 4-bit multiplexer 60. Multiplexer 60 demultiplexes the contents of holding register 52 four bits at a time, beginning with the lower four bits (i.e. bits 1–4), in response to the high half cycle of muxing signal K, and switching to the upper four bits (i.e. bits 5–8) in response to the low half cycle of signal K. As shown, signal K transitions approximately midway each decoding cycle, or in other words, halfway between register read operations, which occur every 2.86 microseconds (as in the case of register load operations for encoder 30). Accordingly, the nibbles of a decoded byte are demultiplexed at times corresponding to their acquisition with respect to encoding and decoding cycles.

Figure 3:
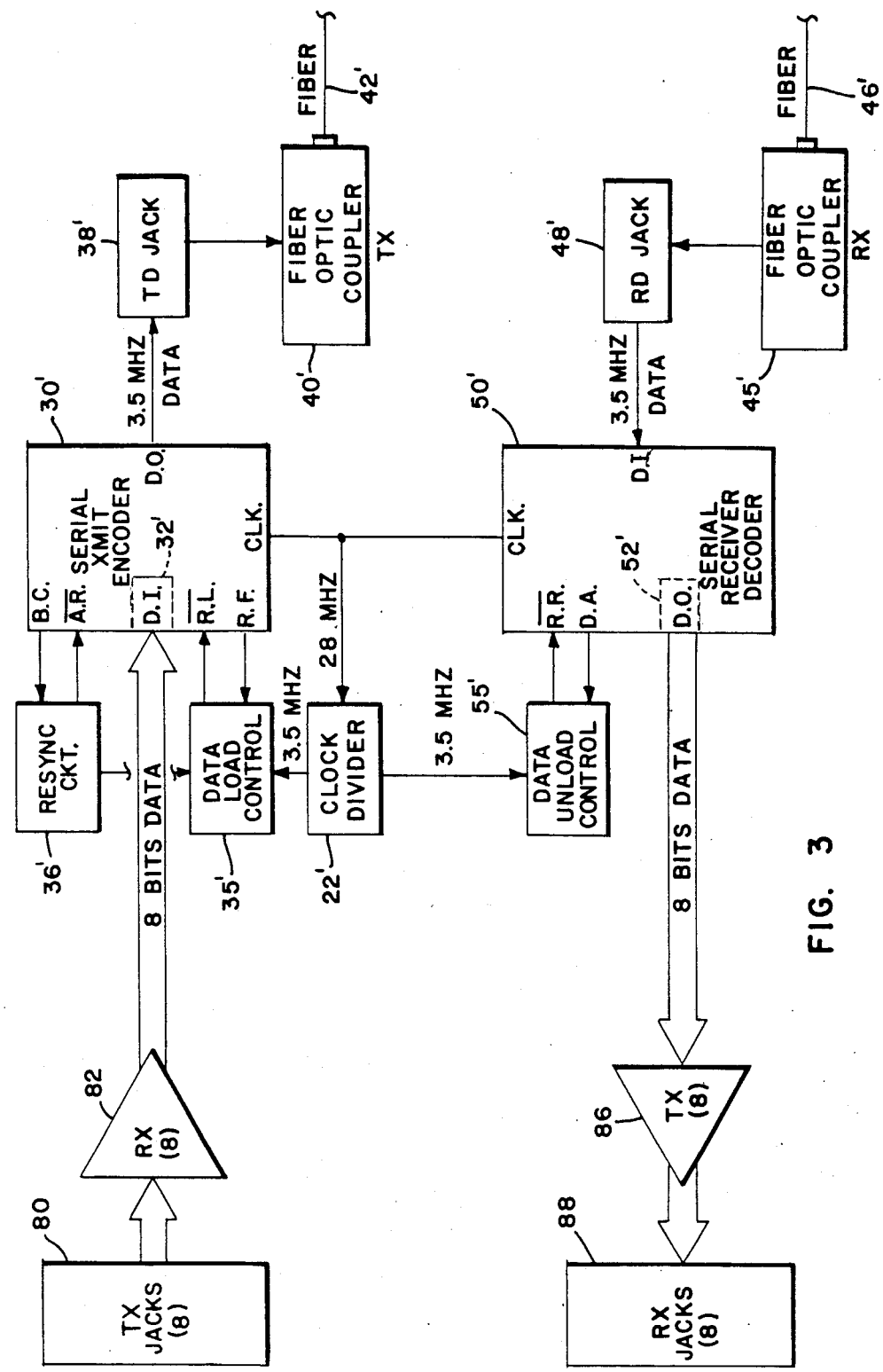
FIG. 3 is an alternate embodiment of the fiber optic multiplexer/demultiplexer according to the present invention.

Referring now to FIG. 3 there is shown an alternate embodiment of the multiplexer/demultiplexer according to the present invention. The embodiment of FIG. 3 is in most respects identical to that of the embodiment of FIG. 1 and accordingly like elements have been given like numerals with "prime" designations. Accordingly, components 22', 30', 32', 35', 36', 38', 40', 42', 45', 46', 48', 50', and 55' each operate in the same manner as specified above with respect to the respective components 22, 30, 32, 35, 36, 38, 40, 42, 45, 46, 48, 50 and 55. However, in the embodiment of FIG. 3, the 4-bit latches 20, 4-bit multiplexer 60, latch clock 21 and multiplexer clock 61 are omitted. Accordingly, the multiplexer/demultiplexer of FIG. 3 provides that eight parallel signals may be sampled once during each encoding cycle of encoder 30', which signals are introduced via jacks 80 and balanced receiver 82. Correspondingly, it is provided that the decoded data from decoder 50' is fed directly to converter 86 and jacks 88. Accordingly, the multiplexer/demultiplexer of FIG. 3 provides a sampling rate of only one-half that provided by the embodiment of FIG. 1, but does provide that twice as many signals may be multiplexed and demultiplexed over an optical fiber.

Thus, there has been described above two embodiments of a fiber optic multiplexer/demultiplexer which may be used to multiplex and demultiplex a plurality of parallel format signals over an optical fiber without regard to the timing relationship between the signals. The timing of the first embodiment of the multiplexer/demultiplexer 10 according to the present invention provides that the multiplexed signals may be up to 64 KHZ in frequency (assuming 50% duty cycle at max frequency) without significant jitter and distortion when the signals are demultiplexed, as may be readily understood upon inspection of the timing diagrams. The timing of the second embodiment provides that signals up to approximately 32 KHZ (assuming 50% duty cycle at max frequency) may be handled without significant jitter and distortion. In the case of RS232C interfaces, the maximum bit rate specified is 19.2 KBS, while for MIL 188C (government) the maximum bit rate specified is 64KBS. Therefore, the second embodiment of the present invention may be used for instance to multiplex up to eight full duplex asynchronous channels (data only), or four synchronous channels (data and clock), or one full duplex synchronous channel (data, clock and six control signals), etc. And, the first embodiment may be used for example to multiplex one MIL 188C channel (date and clock and two control signals). Moreover, it shall be seen that the multiplexer/demultiplexers of the present invention do not require programming, whereby they are transparent to the various interfaces which may be multiplexed therethrough.

Although the present invention has been described herein in its preferred form, those skilled in the art will readily appreciate that various modifications may be made thereto without departing from the spirit and scope of the invention as set forth in the claims appended hereto.

What is claimed is:

1. A fiber optic multiplexer/demultiplexer comprising:
    a plurality y of n-bit latching means each connected to a bus carrying n parallel digital signals, each of said latching means independently operative in response to a respective clocking signal for latching said n-digital signals to form an n-bit nibble output, said numbers y and n being integers, and said number n being greater than 1;
    serial transmitter encoder means including a y* n-bit transmitter holding register connected to said first and second latches, said encoder means responsive to a register load signal for simultaneously loading each of said n-bit nibble outputs of each of said latching means into said transmitter holding register and encoding the contents of said holding register into a serial data stream output, said encoder means generating a register full signal during an encoding cycle lasting from the time said holding register is loaded until the contents of said holding register has been encoded into said serial data stream;
    data load control means responsive to a transition of said register full signal for generating said register load signal;
    a latch clocking means for generating said respective clocking signals, said clocking signals being generated so that each of said latching means acquires one sample of said n parallel signals during each encoding cycle for loading into said transmitter holding register, and so that said samples are taken at regular intervals during said encoding cycle;
    first fiber optic coupling means operatively connected to said encoder means for converting said serial data stream to a corresponding serial data stream of light impulses transmittable over an optical fiber;
    second fiber optic coupling means for receiving a serial data stream of light impulses from an optical fiber and generating a corresponding received serial data stream, said received data stream encoded with y samples each consisting of n-bits of parallel data;
    serial receiver decoder means including an y* n-bit receiver holding register, said decoder means operative in a decoding cycle for decoding said received stream into a y* n-bit parallel byte and loading said byte into said receiver holding register in response to a register read signal, said decoder means generating a data available signal whenever another y* n-bit parallel byte is available to be loaded into said receiver holding register;
    n-bit multiplexer means operatively connected to said holding register and responsive to a muxing signal for demultiplexing said y* n-bit byte n-bits at a time into n-digital signals so that the samples constituting said byte are demultiplexed in the same order as originally acquired;
    data unload control means responsive to said data available signal for generating said register read signal; and
    multiplexer clocking means for generating said muxing signal, said muxing signal being synchronized with said register read signal and timed to cause said multiplexer means to demultiplex said byte held in said holding register at a rate corresponding to said regular intervals during said decoding cycle, said decoding cycle equal in duration to said encoding cycle.

* * * * *